(12) United States Patent
Torson

(10) Patent No.: US 11,463,551 B2
(45) Date of Patent: *Oct. 4, 2022

(54) USING A SHARDED DISTRIBUTED CACHE AS A PIPELINE INTEGRATION BUFFER

(71) Applicant: Walmart Apollo, LLC, Bentonville, AR (US)

(72) Inventor: Andrew Torson, Lafayette, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/076,290

(22) Filed: Oct. 21, 2020

(65) Prior Publication Data

US 2021/0058479 A1 Feb. 25, 2021

Related U.S. Application Data

(63) Continuation of application No. 16/208,143, filed on Dec. 3, 2018, now Pat. No. 10,848,585.

(51) Int. Cl.

| H04L 29/08 | (2006.01) |
|---|---|
| G06F 9/54 | (2006.01) |
| H04L 67/568 | (2022.01) |
| G06F 16/2455 | (2019.01) |
| G06F 16/27 | (2019.01) |

(52) U.S. Cl.
CPC ............ *H04L 67/568* (2022.05); *G06F 9/544* (2013.01); *G06F 9/546* (2013.01); *G06F 16/24568* (2019.01); *G06F 16/27* (2019.01)

(58) Field of Classification Search
CPC .......... G06F 9/542; G06F 9/544; G06F 9/546; G06F 16/24568; G06F 16/27; G06F 16/273; G06F 16/275; G06F 16/278; H04L 67/01; H04L 67/10; H04L 67/288; H04L 67/568

See application file for complete search history.

(56) References Cited

U.S. PATENT DOCUMENTS

| 8,589,361 | B2 | 11/2013 | Hu et al. |
|---|---|---|---|
| 10,009,438 | B2 | 6/2018 | Das |
| 10,019,271 | B2 | 7/2018 | Hsiao et al. |
| 10,409,837 | B1 | 9/2019 | Schmidt et al. |
| 10,445,238 | B1 | 10/2019 | Diestelhorst et al. |
| 10,552,443 | B1 | 2/2020 | Wu et al. |
| 10,606,635 | B2 | 3/2020 | Suzuki et al. |
| 10,684,779 | B2 | 6/2020 | Van Acht et al. |
| 10,691,559 | B2 | 6/2020 | Marathe et al. |

(Continued)

*Primary Examiner* — Kostas J Katsikis

(74) *Attorney, Agent, or Firm* — Duane Morris LLP; Manita Rawat

(57) ABSTRACT

Systems and methods of operating a distributed cache in a fast producer, slow consumer environment are disclosed. A system implements a distributed cache including a plurality of shards. Each shard includes a set of item containers selected from a plurality of containers. A first event related to a first item container in the set of item containers is received and the first item container is updated to include the first event. The first item container is positioned in at least one consumption queue. A second event related to the first item container in the set of item containers is received and the first item container is updated without changing the position of the first item container in the at least one consumption queue.

16 Claims, 5 Drawing Sheets

(56) References Cited

U.S. PATENT DOCUMENTS

| | | | |
|---|---|---|---|
| 2002/0147611 A1 | 10/2002 | Greene et al. | |
| 2007/0073821 A1 | 3/2007 | Brail | |
| 2007/0203910 A1 | 8/2007 | Ferguson et al. | |
| 2009/0240664 A1* | 9/2009 | Dinker | G06F 12/0866 |
| 2009/0240869 A1* | 9/2009 | O'Krafka | G06F 12/0284 |
| | | | 710/316 |
| 2011/0283045 A1 | 11/2011 | Krishnan et al. | |
| 2012/0017037 A1* | 1/2012 | Riddle | G06F 16/24569 |
| | | | 711/E12.008 |
| 2013/0074083 A1* | 3/2013 | Oliver | G06F 16/27 |
| | | | 719/318 |
| 2015/0039712 A1 | 2/2015 | Frank et al. | |
| 2016/0188453 A1 | 6/2016 | Chu et al. | |
| 2016/0344834 A1 | 11/2016 | Das | |
| 2017/0090955 A1 | 3/2017 | Hsiao et al. | |
| 2018/0089278 A1* | 3/2018 | Bhattacharjee | H04L 67/1097 |
| 2018/0278714 A1 | 9/2018 | Das | |
| 2018/0336248 A1 | 11/2018 | Seo et al. | |
| 2019/0012105 A1 | 1/2019 | Schreter | |
| 2019/0075063 A1 | 3/2019 | McDonnell et al. | |
| 2019/0236194 A1* | 8/2019 | James | G06F 16/24542 |
| 2019/0392006 A1 | 12/2019 | Horowitz et al. | |
| 2020/0067763 A1 | 2/2020 | Vytla | |
| 2020/0099614 A1 | 3/2020 | Vutharkar et al. | |
| 2020/0151154 A1 | 5/2020 | Kumar et al. | |
| 2020/0151166 A1 | 5/2020 | Shekhar et al. | |
| 2020/0151191 A1 | 5/2020 | Agrawal et al. | |
| 2020/0151206 A1 | 5/2020 | Balakavi et al. | |
| 2020/0177695 A1 | 6/2020 | Torson | |
| 2020/0213380 A1 | 7/2020 | Paduroiu et al. | |

\* cited by examiner

USING A SHARDED DISTRIBUTED CACHE AS A PIPELINE INTEGRATION BUFFER

CROSS-REFERENCE TO RELATED APPLICATIONS

This application is a Continuation Application of, and claims priority to, U.S. patent application Ser. No. 16/208,143, filed on Dec. 3, 2018, which is herein incorporated by reference in its entirety.

TECHNICAL FIELD

This application relates generally to cache systems and, more particularly, to distributed cache systems including a streaming pipeline.

BACKGROUND

In e-commerce and other network-based environments, processing workflows operating in real-time are configured to receive and process events (e.g., price updates, inventory updates, inventory addition/subtraction, corrections, etc.). The data pipeline, or firehose, can include a large number of incoming events, for example, billions of events per day. Ingestion and processing of such events is required to maintain up-to-date information for the network-based environment, such as, for example, up-to-date pricing and competitive information for e-commerce environments.

The large number (e.g., billions) of events generated by the data pipeline can overwhelm current ingestion systems. If the number of events received from the data pipeline is greater than the number of events that can be processed by the ingestion system in the same time frame, the backlog of events to be processed will continuously increase, e.g., unbounded increase. An unbounded increase in backlog events prevents the ingestion system from clearing the backlog and causes the ingestion system to fall further behind the real-time data being delivered in the data pipeline.

SUMMARY

In various embodiments, a system including a computing device is disclosed. The computing device is configured to implement a distributed cache comprising a plurality of shards. Each shard comprises a set of item containers selected from a plurality of containers. The computing device is further configured to receive a first event related to a first item container in the set of item containers and update the first item container to include the first event. The computing device positions the first item container in at least one consumption queue. The computing device is configured to receive a second event related to the first item container in the set of item containers and update the first item container without changing the position of the first item container in the at least one consumption queue.

In various embodiments, a non-transitory computer readable medium having instructions stored thereon. The instructions, when executed by a processor cause a device to perform operations including implementing a distributed cache having a plurality of shards. Each shard includes a set of item containers selected from a plurality of container. The device is further configured to receive a first event related to a first item container in the set of item containers and update the first item container to include the first event. The first item container is positioned in at least one consumption queue and a second event related to the first item container in the set of item containers is received. The first item container is updated without changing the position of the first item container in the at least one consumption queue.

In various embodiments, a method is disclosed. The method includes a step of implementing a distributed cache having a plurality of shards. Each shard includes a set of item containers selected from a plurality of container. A first event related to a first item container in the set of item containers is received and the first item container is updated to include the first event. The first item container is positioned in at least one consumption queue and a second event related to the first item container in the set of item containers is received. The first item container is updated without changing the position of the first item container in the at least one consumption queue

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, systems and methods of operating a distributed cache to reduce backlog is disclosed. The distributed cache includes a plurality of shards each including a set of item containers. A plurality of events related to each item container in the set of item containers is received. When a first item related to an item container is received, a first item container including the first event is positioned in at least one consumption queue. When subsequent events are received, the first item container is updated without changing the position of the first item container in the at least one consumption queue. A downstream process retrieves the first item container and processes all of the events stored in the first item container.

Figure 1:
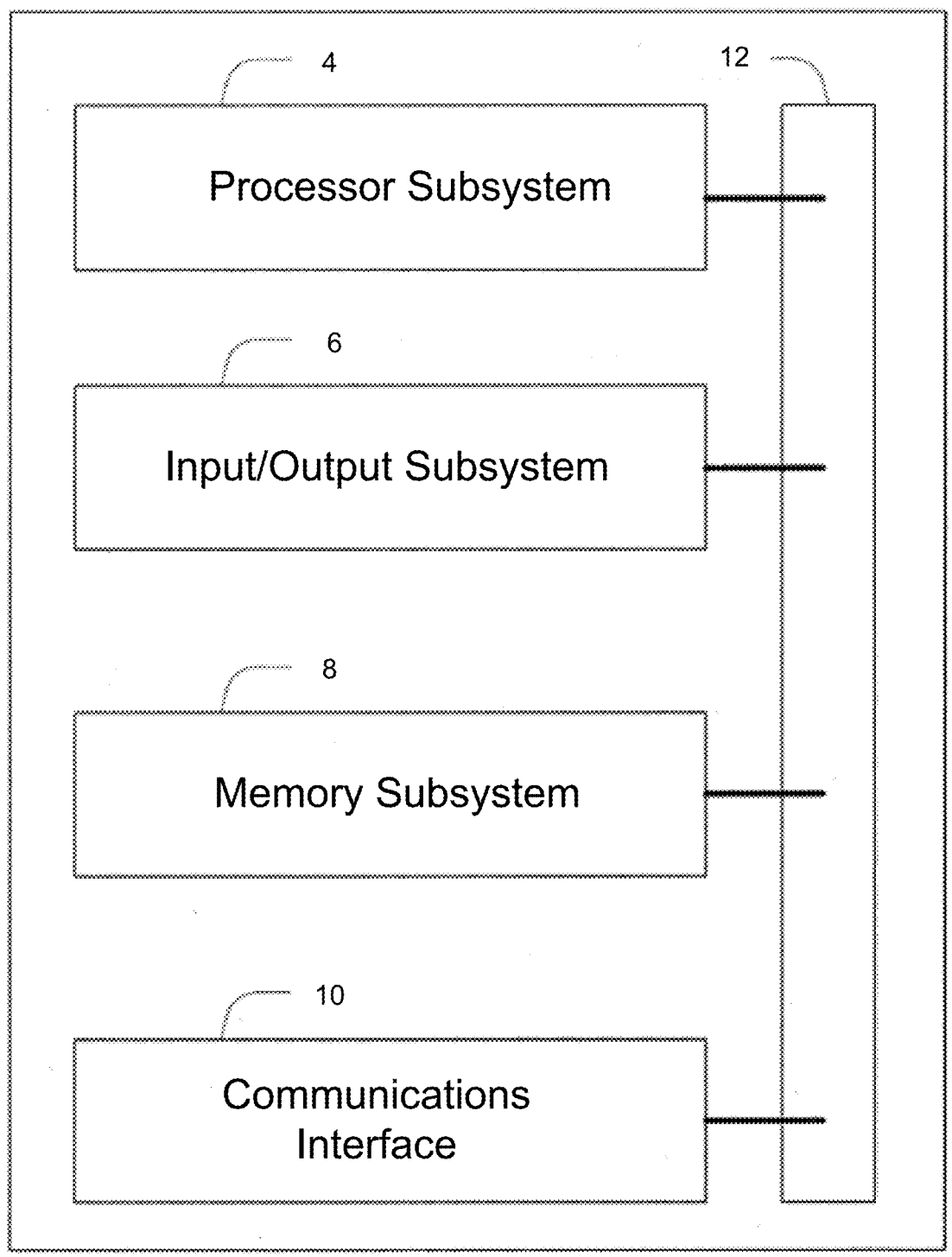
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including an input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
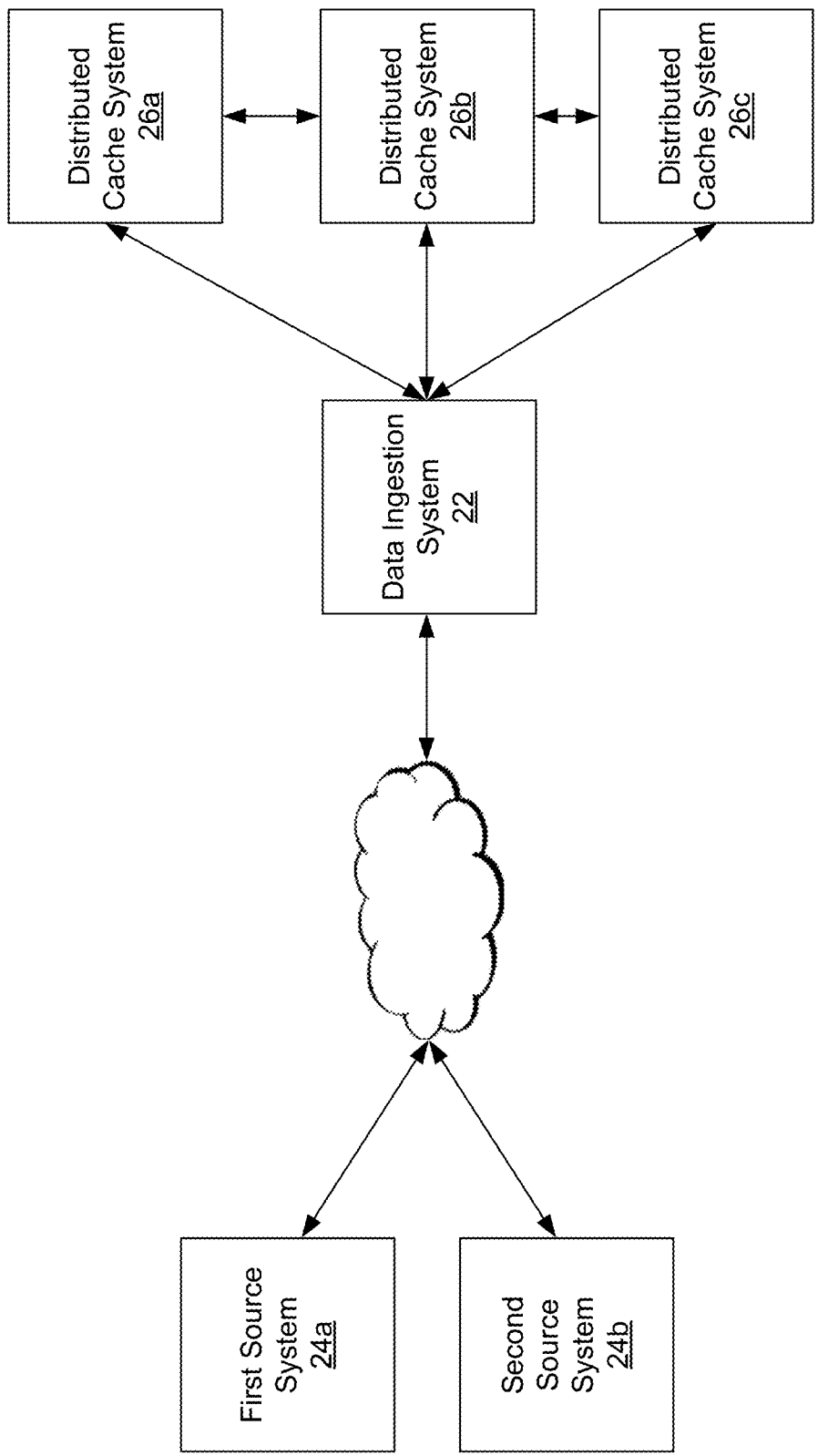
FIG. 2 illustrates a network configured to provide ingestion of data using a distributed sharded cache, in accordance with some embodiments.

FIG. 2 illustrates a network 20 including a data ingestion system 22, a first source system 24a, a second source system 24b, and a plurality of distributed cache systems 26a-26c. Each of the systems 22-26c can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, the data ingestion system 22, and at least one distributed cache system 26a may be implemented by a shared server or shared network system. Similarly, the data source systems 24a, 24b may be integrated into additional systems, such as networked systems or servers.

In some embodiments, the data ingestion system 22 is configured to provide a data ingestion interface to the source systems 24a, 24b. For example, in some embodiments, the data ingestion system 22 is configured to provide a data ingestion frontend for receiving data input from one or more data ingestion source systems 24a, 24b. As one example, in some embodiments, the data ingestion system 22 is configured to provide a buffer having a high write speed configured to record each event received from the plurality of source systems 24a-24b, although it will be appreciated that the disclosed systems and methods can be applied to any suitable ingestion systems.

In some embodiments, each of the source systems 24a-24b are configured to generate a data stream (or pipeline) of data (or events) for ingestion by the data ingestion system 22. The events are related to one or more items in a distributed catalog maintained by the plurality of distributed cache systems 26a-26c. For example, in some embodiments, each of the source systems 24a-24c is configured to generate a continuous and/or discrete stream of events related to products in an e-commerce catalog. Although specific embodiments are discussed herein including an e-commerce catalog, it will be appreciated that the disclosed systems and methods can be applied to any suitable ingestion system configured to ingest and process events related to any catalog of items stored in a distributed database.

In some embodiments, and as discussed in greater detail below, each of the distributed cache systems 26a-26c is configured to maintain a cache corresponding to a predetermined set of records or items from the catalog (e.g., a shard). Each distributed cache system 26a-26c can be located on a separate system, such as a separate server, and/or on a logical partition of a single server. In some embodiments, one or more of the distributed cache systems 26a-26c are copies, or redundancies, of other distributed cache systems 26a-26c.

Figure 3:
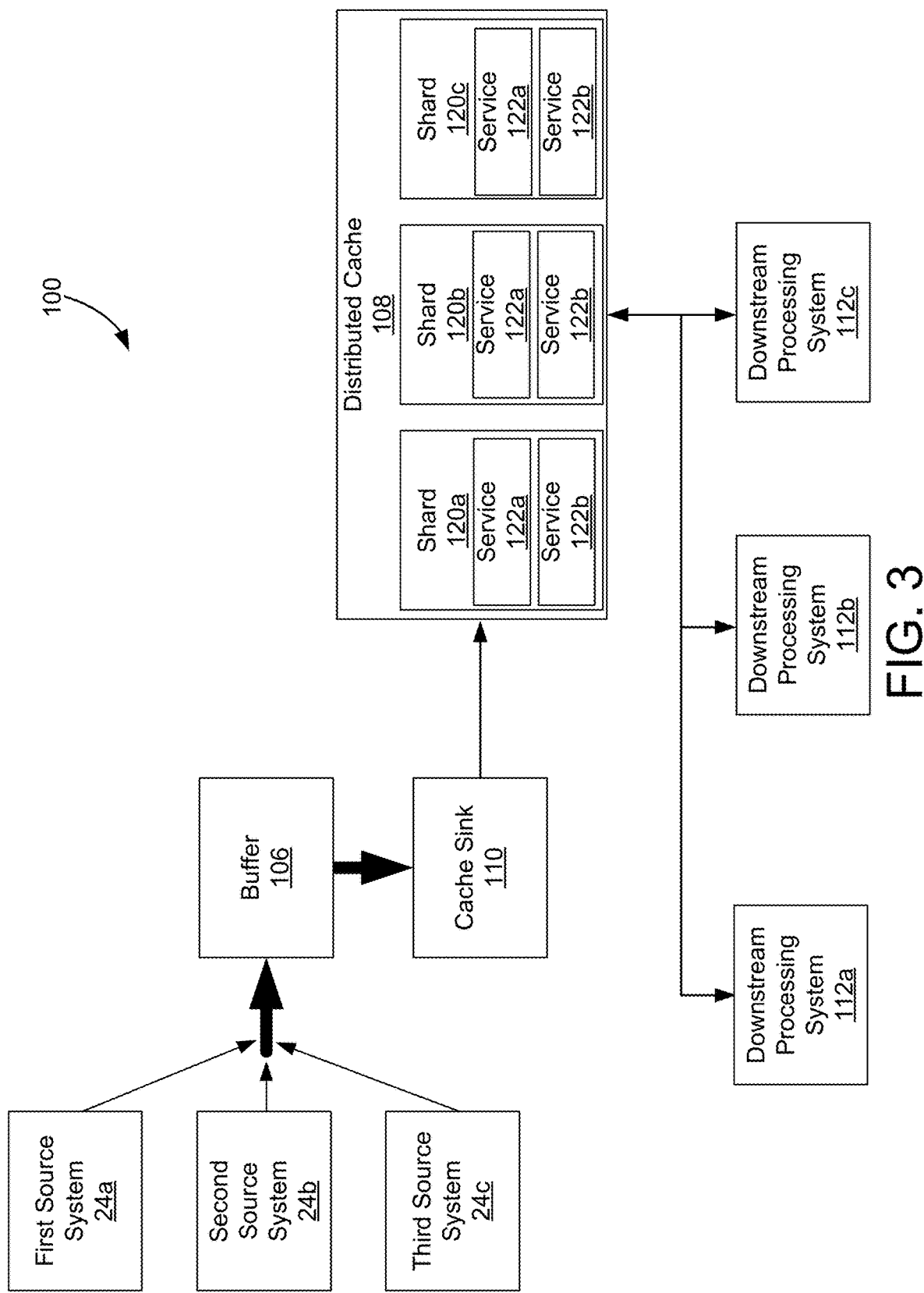
FIG. 3 illustrates a process flow for ingesting data form multiple sources using a distributed sharded cache, in accordance with some embodiments.

FIG. 3 illustrates an ingestion environment 100 configured to implement a distributed sharded cache 108 for data ingestion, in accordance with some embodiments. A plurality of data sources 24a-24c are configured to generate one or more inputs (or events). The collective input of one or more of the data sources 24a-24c is referred to herein as a data pipeline 104. The plurality of data sources 24a-24c can provide any data for processing and ingestion. For example, the plurality of data sources 24a-24c can include a new item data source 24a configured to provide input data regarding new items to be added to the database (e.g., new products for inclusion in an e-commerce catalog, etc.). As another example, in some embodiments, the plurality of data sources 24a-24c includes a store price data source 24b configured to provide price information for each product in an e-commerce catalog. Additional examples of a data source in e-commerce embodiments, include, but are not limited to, pricing information updates, description updates, competitive information, offers and promotions, new item setup, store prices, inventory availability, third party analytics, vendor system inputs, and/or any other suitable event. Although specific embodiments are discussed herein, it will be appreciated that the ingestion environment 100 can be configured to ingest any suitable events from a data pipeline related to a catalog of items maintained by a distributed cache. In some embodiments, the plurality of data sources can include an application data source 24c configured to provide data from a management application such as, for example, application updates, database queries, row updates, and/or any other suitable data.

In some embodiments, the data pipeline 104 (e.g., each event generated by an ingestion source 24a, 24b) is provided to a buffer 106 configured to receive and store (e.g., write) each event in the data pipeline 104. The buffer 106 provides a high write rate sufficient to write each event in the data pipeline 104. In some embodiments, the buffer 106 can include a distributed database having a journal with a high-write speed sufficient to record each event in the data pipeline 104 as the events are received. For example, in some embodiments, the buffer 106 can include an implementation of the Apache Cassandra distributed database. After each event is written to the buffer 106, the events are divided into a distributed cache 108 and processed by downstream processing systems, as discussed below.

In various embodiments, the events written into the buffer 106, i.e., events received in the data pipeline 104, can include row change events, table join (or data aggregation) events, row add events, and/or any other suitable events. A cache sink 110 is configured to retrieve each event from the buffer 106 and place each event in a shard 120a-120c maintained by a distributed cache 108 (described in greater detail below). The cache sink 110 can include a process and/or system configured to read each event from the buffer 106, identify a shard 120a-120c including a container associated with a catalog item related to the event, and update the container maintained by the shard 120a-120c to include the event. In some embodiments, the cache sink 110 is implemented by a data ingestion system 22, although it will be appreciated that any suitable system can implement the cache sink 110.

In some embodiments, the ingestion system 100 includes a distributed cache 108 comprising a plurality of shards 120a-120c. Each shard 120a-120c includes a predetermined set of containers (or cache entries) related to a selected category and/or sub-section of items maintained by the entire distributed cache 108. For example, in an e-commerce environment, each shard 120a-120c can relate to a category of products available within the e-commerce environment (e.g., sporting goods, groceries, home goods, etc.), a sub-category of products (e.g., hockey goods, baseball goods, football goods, etc.), and/or any other division of products within the e-commerce environment. Although specific embodiments are discussed herein, it will be appreciated that the each shard 120a-120c can include any set of cache entries related to any designated category.

As discussed above, the data pipeline 104 includes a large number of incoming events, for example, billions of events per day, with multiple events being related to a single cache entry maintained by the distributed cache 108. For example, in some embodiments, the data pipeline 104 may include a price change event, a promotion event, competitive information, and third party analytics each related to the same catalog item maintained in the distributed cache 108. The distributed cache 108 is configured to manage the number of pending items to be processed by downstream processing systems 112a-112c by merging all events related to a single catalog item into a single container maintained by the distributed cache 108. In traditional systems, a new cache entry is generated for each event received in the data pipeline 104, causing the processing backlog to grow unbounded. The distributed cache 108 prevents this unbounded processing backlog by maintaining a single container for each catalog item. The distributed cache 108 merges all of the events related to a single catalog item into the single container maintained by the distributed cache 108.

In some embodiments, each cache entry (or container) is processed by one or more downstream processes 112a-112c. Each of the downstream processes 112a-112c is configured to process cache entries in a specific shard 120a-120c within the distributed database 108. When one or more downstream processes are ready to process a cache entry related to a catalog item, all of the events in the cache entry are processed simultaneously. By implementing a single cache entry for each catalog item, the number of entries in the distributed cache 108 is bounded such that the number of cache entries cannot exceed the number of items in the downstream processes 112a-112c process the cache entries at a lower rate than arrival of events in the pipeline 104, i.e., the pipeline 104 is a fast producer and the downstream processes 112a-112c are slow consumers. Traditional ingestion systems utilize a process referred to as backpressure in which a slow consumer generates a message to the fast producer to reduce the production rate of the fast consumer to match the ingestion rate of the slow consumer. Although backpressure allows the producer to match the rate of the consumer, limiting the producer is not desirable in many database systems. Even when the producer is limited, the backlog of events to be processed can still grow at an unbounded rate. The downstream processes 112a-112c can include, for example, a plurality of distributed services such as hypertext transfer protocol (HTTP) services, database processing services, and/or any other suitable services that are configured to process and/or ingest cache entries in the distributed cache 108.

In some embodiments, the single cache entry for each catalog item within the distributed cache 108 eliminates the need for backpressure. When a cache processing component 112a-112c is ready to process a cache entry, the cache processing component 112a-112c retrieves the cache container for the catalog item containing the accumulated events (or Δ of events). When a downstream processing component 112a-112c retrieves a cache record, the downstream processing component processes all of the accumulated events in the container. The number of accumulated events contained in a cache entry at the time of processing is variable, with some cache entries having a greater or lesser number of events depending on the number of events related to the catalog item received in the data pipeline 104 since the creation of the cache entry. By processing all accumulated events in a single processing cycle, the ingestion system 100 is able to maintain a high rate of input (e.g., fast producer) and slow rate of processing (e.g., slow consumer) without needing to apply backpressure to the data pipeline 104.

In some embodiments, the distributed cache 108 is configured to implement co-location and co-sharding of downstream processes 112a-112c to allow each cache entry to be processed at a rate sufficient to maintain the input rate of the data pipeline 104 (i.e., no backpressure). In some embodiments, each shard 120 includes a set of downstream services 112a-112c dedicated to processing the cache entries in that shard. The downstream services 112a-112c are co-located with the shard 120, i.e., are located (or instantiated) on the same device as the associated shard 120. For each shard 120 that is generated, the ingestion system 100 selects a set of co-located services 122a, 122b and implements the co-located services 122a, 122b and the shard 120 on a single system (e.g., single partition within a server, single device, etc.). The use of co-located services 122a, 122b eliminates the need to transfer data between systems for processing.

Figure 4:
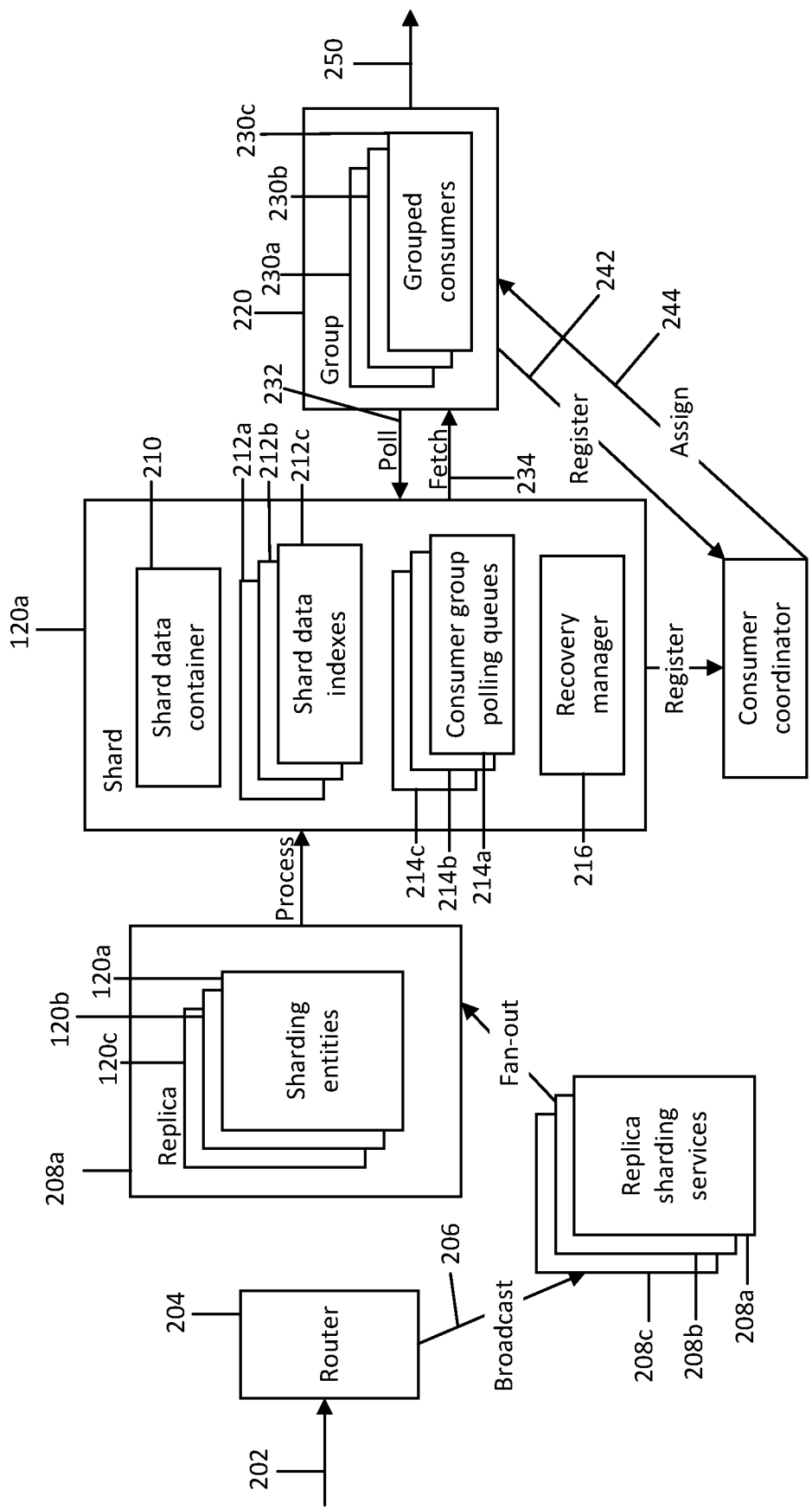
FIG. 4 illustrates a distributed cache for use in the network illustrated in FIG. 2, in accordance with some embodiments.

FIG. 4 illustrates a distributed cache 108a for use in the ingestion system 100 of FIG. 3, in accordance with some embodiments. The distributed cache 108a receives an input data stream 202, for example, from a distributed buffer 106 as discussed with respect to FIG. 3. The input data stream 202 is provided to a router 204 that identifies the shard 120a-120c associated with each event in the input data stream 202. The router 204 broadcasts 206 each event in the data stream 202 to a set of replica sharding services 208a-208c configured to maintain a shard 120a-120c associated with the event, e.g., a shard 120a-120c associated with a category of catalog items containing the item related to the specific event.

In some embodiments, each replica sharding service 208a-208c is configured to maintain a redundant set of shards 120a-120c containing a single category of items from the item catalog. As illustrated in FIG. 4, in some embodiments, each shard 120a-120c includes a shard data container 210, a set of shard data indexes 212a-212c, a set of consumer group polling queues 214a-214c, and/or a recovery manager 216 configured to assist in shard recovery. In some embodiments, each shard 120a-120c is maintained as an in-memory shard. Each shard data container 210 is configured to maintain a container containing the delta events related to each catalog item for the category associated with the shard 120a-120c.

In some embodiments, the consumer group polling queues 214a-214c are configured to allow any number of consumer groups 220 (e.g., cache consumers) to receive data from a container maintained in the shard data container 210. In some embodiments, the shard 120a-120c is configured to receive an event from the data pipeline 202 and determine whether the container in the shard data container 210 is set to be consumed (e.g., is in a group queue). If the container is already positioned in at least one group queue, the shard 120a-120c updates the container. If the container is not in at least one group queue, the shard 120a-120c updates the container and places the container into the appropriate queue for consumption by a downstream process 112a-112c. Each consumer group 220 can include any number of grouped consumers 230a-230c.

Each downstream consumer group 220 can poll 232 the shard 120a to fetch 234 pending containers for processing by downstream processes 112a-112c. In some embodiments, a consumer coordinator 240 is configured to register 242 and assign 244 downstream processes 112a-112c to one or more consumer groups 230a-230c. Each consumer group 230a-230c is configured to collect (or consume) 250 each container within the shard 120a, as discussed above with respect to FIG. 3.

Figure 5:
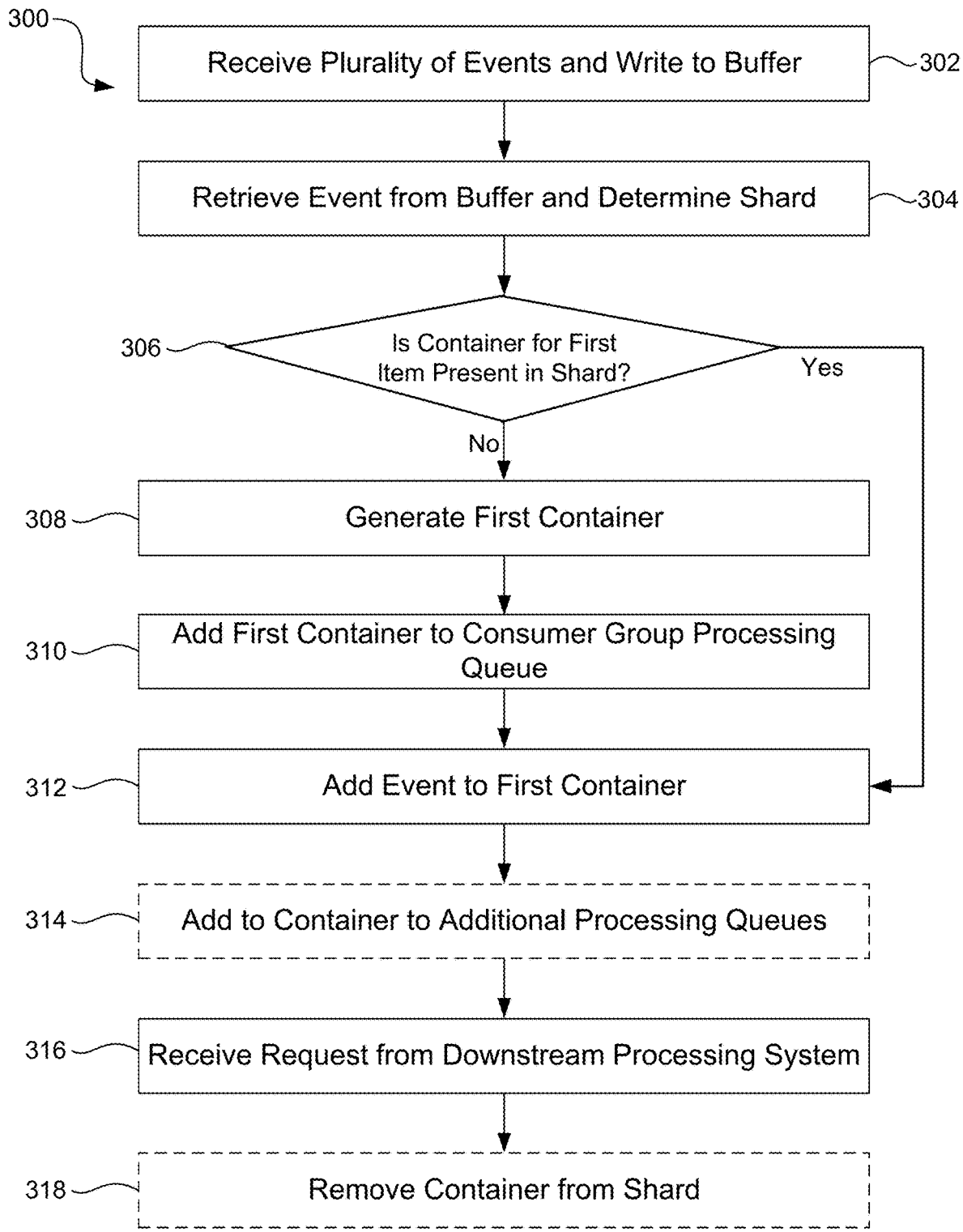
FIG. 5 illustrates a method of data ingestion using a distributed cache to limit backlog, in accordance with some embodiments.

FIG. 5 illustrates a method 300 of operating the distributed cache 108 to limit backlog, in accordance with some embodiments. At step 302, a plurality of events (e.g., a first event, a second event, etc.) are received in the data pipeline 104 and written to the buffer 106. Each event in the plurality of events is related to a first item maintained in the catalog (e.g., a first item in the distributed cache 108). At step 304, the cache sink 110 retrieves an event, such as the first event, from the buffer 106 and determines the shard 120a-120c that is configured to maintain a container related to the first item. For example, if the first event is a price change for a hockey stick, the cache sink 110 will identify a shard 120a configured to maintain containers related to "hockey goods." It will be appreciated that specific shard categories are provided only as examples and shards 120a-120c may be generated based on any suitable delineation of items in a catalog.

At step 306, the first shard 120a receives one of the plurality of events from the cache sink 110 and determines if a container exists for the first item. If the first item does not have a corresponding container in the first shard 120a, the method proceeds to step 308 and generates a first container corresponding to the first item. The container includes a data structure configured to receive and store events and event information related to the first item. For example, if the first shard 120a receives the first event from the cache sink 110, the first shard 120a can generate a first container corresponding to the first item and write the first event into a data structure within the first container (at step 310 discussed below).

At step 310, the shard 120a adds the first container to a consumer group processing queue 214a-214c corresponding to the received event. For example, to continue the example from above, after adding a price change event to the first container, the shard 120a may assign the first container to a consumer group processing queue 214a related to processing row changes for specific items. If, at step 306, the first shard determines a container exists for the first item, the method 300 proceeds directly to step 312.

At step 312, the event related to the first item is written into the first container. The first container is updated to add each subsequent event without altering the set of events previously written into the first container. For example, at time t0, the shard 120a receives the first event and generates the first container. The first event is added to the first container. At time ti, the shard 120*a* receives a second event, which is added sequentially to the first container without altering the first event. At time $t_n$, the shard receives an nth event, which is added sequentially to the first container without altering any of the previous (e.g., n–1) events. Each event is added to the shard 120*a* without altering the position of the shard 120*a* in the at least one consumer group processing queue 214*a*-214*c*. For example, in some embodiments, the first container is maintained by a shard data container 210. The first container is updated to include each event as it is received by the first shard 120*a*. The first shard 120*a* also maintains a consumer group processing queue 214*a* with a reference to the first container, allowing the first container to be updated without affecting the reference contained in the consumer group processing queue 214*a*.

At optional step 314, the shard 120*a* determines whether the first container should be added to at least one additional consumer group processing queue 214*a*-214*c*. The shard 120*a* determines whether the first container has been added to a specific consumer group processing queue 214*a*-214*c* related to the nth event added to the first container. For example, if the first container receives a price change event but is not present in a first consumer group processing queue 214*a* related to processing row changes, the method 300 adds the first container to the first consumer group processing queue 214*a*, regardless of whether the first container has been added to one or more other consumer group processing queues 214*b*-214*c*. The first container is added to the first consumer group processing queue 214*a* without altering the position of the first container in any other consumer group processing queue 214*b*-214*c*.

At step 316, the shard 120*a* receives a request from a downstream processing system 112*a*-112*c* for the first container (e.g., the first container is present in a first position of a consumer group processing queue 214*a*-214*c* when a downstream system 112*a*-112*c* requests the next item for processing). The shard 120*a* provides the first container, including all accumulated events up to the nth event, to the downstream processing system 112*a*-112*c*. The downstream processing system 112*a*-112*c* receives the first container and processes each of the events included in the first container at the time of the request from the downstream processing system 112*a*-112*c* (e.g., n events).

At optional step 318, the shard 120*a* removes the first container from the shard data container 210 and/or removes all events up to the nth event from the first container. The first container is pushed from the consumer group processing queue 214*a*-214*c*. When subsequent events are received for the first item, the shard 120*a* returns to step 306 and generates a new container for the first item and places the new container into a consumer group processing queue 214*a*-214*c*.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
  a computing device configured to:
    receive at least a first event from at least one data source;
    write at least the first event to a distributed buffer, wherein the distributed buffer has a write-rate equal to or greater than a rate of receipt of a plurality of events;
    implement a distributed cache comprising a shard, wherein the shard comprises a set of item containers; and
    determine if a first type of at least the first event corresponds to any of the set of item containers, wherein:
      if the first type corresponds to a first item container of the set of item containers, update the first item container to include at least the first event; and
      if the first type does not correspond to any of the set of item containers:
        generate a second item container for events of the first type;
        associate the second item container with the shard; and
        update the second item container to include at least the first event.

2. The system of claim 1, wherein the first type does not correspond to the first item container, and wherein the computing device is further configured to:
  receive a request from at least one downstream process for the second item container; and
  provide the second item container to the at least one downstream process, wherein the second item container includes at least the first event.

3. The system of claim 2, wherein the computing device is further configured to remove at least the first event from the second item container.

4. The system of claim 1, wherein the shard comprises:
  a shard data container configured to maintain the set of item containers;
  at least one shard data index configured to provide lookup of the set of item containers in the shard data container; and
  a plurality of consumer group polling queues.

5. The system of claim 4, wherein the computing device is further configured to:
  receive a request within one of the plurality of consumer group polling queues from a downstream process for the first item container; and
  in response to the request, provide the first item container to the downstream process.

6. The system of claim 1, wherein the first type corresponds to the first item container, and wherein the computing device is further configured to:
  position the first item container in at least one consumption queue;
  receive at least a second event;
  determine that a second type of the second event corresponds to the first item container; and
  update the first item container without changing the position of the first item container in the at least one consumption queue.

7. The system of claim 6, wherein the computing device is configured to:
  receive a plurality of additional events related to the first item container;

update the first item container to include each of the plurality of additional events without changing the position of the first item container in the at least one consumption queue; and provide the first item container from the at least one consumption queue, wherein the first item container includes at least the first event and the plurality of additional events.

8. The system of claim 1, wherein the distributed buffer comprises a distributed database comprising a journal configured to allow writing at the write-rate equal to or greater than the rate of receipt of the plurality of events.

9. A non-transitory computer readable medium having instructions stored thereon, wherein the instructions, when executed by a processor cause a device to perform operations comprising:

receiving at least a first event from at least one data source;

writing at least the first event to a distributed buffer, wherein the distributed buffer has a write-rate equal to or greater than a rate of receipt of a plurality of events;

implementing a distributed cache comprising a shard, wherein the shard comprises a set of item containers; and determining if a first type of at least the first event corresponds to any of the set of item containers, wherein:

if the first type corresponds to a first item container of the set of item containers, updating the first item container to include at least the first event; and if the first type does not correspond to any of the set of item containers:

generating a second item container for events of the first type;

associating the second item container with the shard; and updating the second item container to include at least the first event.

10. The non-transitory computer readable medium of claim 9, wherein the instructions, when executed by the processor cause the device to perform further operations comprising:

positioning the first item container in at least one consumption queue;

receiving at least a second event;

determining that a second type of at least the second event corresponds to the first item container; and updating the first item container without changing the position of the first item container in the at least one consumption queue.

11. The non-transitory computer readable medium of claim 9, wherein the instructions, when executed by the processor cause the device to perform further operations comprising:

receiving a request from at least one downstream process for the second item container; and providing the second item container to the at least one downstream process, wherein the second item container includes at least the first event.

12. The non-transitory computer readable medium of claim 9, wherein each shard comprises a shard data container configured to maintain the set of item containers, at least one shard data index configured to provide look-up of the set of item containers in the shard data container, and a plurality of consumer group polling queues, and wherein the instructions, when executed by the processor cause the device to perform further operations comprising:

receiving a request within one of the plurality of consumer group polling queues from a downstream process for the first item container; and in response to the request, providing the first item container to the downstream process.

13. A method, comprising:

receiving at least a first event from at least one data source;

writing at least the first event to a distributed buffer, wherein the distributed buffer has a write-rate equal to or greater than a rate of receipt of a plurality of events;

implementing a distributed cache comprising a shard, wherein the shard comprises a set of item containers; and determining if a first type of at least the first event corresponds to any of the set of item containers, wherein:

if the first type corresponds to a first item container of the set of item containers, updating the first item container to include at least the first event; and if the first type does not correspond to any of the set of item containers:

generating a second item container for events of the first type;

associating the second item container with the shard; and updating the second item container to include at least the first event.

14. The method of claim 13, wherein each shard comprises a shard data container configured to maintain the set of item containers, at least one shard data index configured to provide look-up of the set of item containers in the shard data container, and a plurality of consumer group polling queues, the method further comprising:

receiving a request within one of the plurality of consumer group polling queues from a downstream process for the first item container; and in response to the request, providing the first item container to the downstream process.

15. The method of claim 13, wherein each shard comprises:

positioning the first item container in at least one consumption queue;

receiving at least a second event;

determining that a second type of at least the second event corresponds to the first item container; and updating the first item container without changing the position of the first item container in the at least one consumption queue.

16. The method of claim 13, comprising:

receiving a request from at least one downstream process for the second item container; and providing the second item container to the at least one downstream process, wherein the second item container includes at least the first event.

* * * * *